United States Patent
Schneider et al.

(10) Patent No.: US 6,180,281 B1
(45) Date of Patent: *Jan. 30, 2001

(54) COMPOSITE SEPARATOR AND ELECTRODE

(75) Inventors: Daniel A. Schneider, Madison; Joseph P. Nestler, Verona; Shirley A. Craanen, Madison; Timothy J. Stachoviak, Waunakee, all of WI (US); Lonnie G. Johnson, Smyrna, GA (US)

(73) Assignee: Johnson Research & Development Company, Inc., Smyrna, GA (US)

( * ) Notice: Under 35 U.S.C. 154(b), the term of this patent shall be extended for 0 days.

This patent is subject to a terminal disclaimer.

(21) Appl. No.: 08/989,709

(22) Filed: Dec. 12, 1997

(51) Int. Cl.[7] .............. H01M 2/14; H01M 4/02; H01M 4/48; H01M 4/58

(52) U.S. Cl. .............. 429/129; 429/131; 429/137; 429/209; 429/217; 429/231.1; 429/231.8; 429/246; 429/247

(58) Field of Search .............. 429/129, 131, 429/132, 133, 136, 137, 162, 209, 218.1, 231.1, 231.3, 231.8, 246, 247, 249, 253, 254, 217

(56) References Cited

U.S. PATENT DOCUMENTS

| | | | |
|---|---|---|---|
| 4,550,064 | 10/1985 | Yen et al. | 429/94 |
| 4,654,281 * | 3/1987 | Anderman et al. | 429/209 |
| 4,994,335 | 2/1991 | Kamaei et al. | 429/254 |
| 5,219,680 | 6/1993 | Fauteux | 429/192 |
| 5,227,264 | 7/1993 | Duval et al. | 429/153 |
| 5,260,148 | 11/1993 | Idota | 429/198 |
| 5,336,573 * | 8/1994 | Zuckerbrod | 429/252 |
| 5,350,645 | 9/1994 | Lake et al. | 429/124 |
| 5,362,581 * | 11/1994 | Chang et al. | 429/249 |
| 5,387,479 | 2/1995 | Koksbang | 429/126 |
| 5,426,006 | 6/1995 | Delnick et al. | 429/218 |
| 5,427,872 | 6/1995 | Shen et al. | 429/142 |
| 5,478,364 | 12/1995 | Mitate et al. | 29/623.5 |
| 5,478,673 | 12/1995 | Funatsu | 429/197 |
| 5,498,489 | 3/1996 | Dasgupta et al. | 424/152 |
| 5,512,389 | 4/1996 | Dasgupta et al. | 429/192 |
| 5,540,741 | 7/1996 | Gozdz et al. | 29/623.5 |
| 5,571,634 | 11/1996 | Gozdz et al. | 429/192 |
| 5,607,485 | 3/1997 | Gozdz et al. | 29/623.5 |
| 5,677,083 | 10/1997 | Tomiyama | 429/194 |
| 5,686,201 | 11/1997 | Chu | 429/52 |
| 5,691,047 | 11/1997 | Kurauchi et al. | 428/315.7 |
| 5,702,845 | 12/1997 | Kawakami et al. | 429/224 |
| 5,705,292 | 1/1998 | Yukita et al. | 429/137 |
| 5,714,277 | 2/1998 | Kawakami | 429/62 |
| 5,731,104 | 3/1998 | Ventura et al. | 429/188 |
| 5,778,515 * | 7/1998 | Menon | 29/623.4 |
| 5,811,205 * | 9/1998 | Andrieu et al. | 429/137 |

* cited by examiner

*Primary Examiner*—Maria Nuzzolillo
*Assistant Examiner*—Jonathan Crepeau
(74) *Attorney, Agent, or Firm*—Kennedy, Davis & Hodge, LLP (57) ABSTRACT

An electrode and separator composite comprises a separator and an electrode embedded in a polymer matrix. Application of an electrode slurry to a polymer coated separator and subsequent drying in a solvent enriched atmosphere forms a secondary battery structure characterized by a seamless composite structure.

10 Claims, 10 Drawing Sheets

COMPOSITE SEPARATOR AND ELECTRODE

FIELD OF THE INVENTION

The present invention relates to rechargeable solid state lithium ion batteries, and more particularly to a composite electrode-separator with improvements in function and manufacturability.

BACKGROUND OF THE INVENTION

In the construction of any battery, six elements must be present, namely, a positive and negative electrode, a housing, a separator, an electrolyte, and current collectors. These elements are incorporated into lithium ion batteries in thin sheets. The joining of the electrodes with the separator in lithium ion batteries is an important part of the manufacturing process. First, the bond between separator and electrode must be strong enough to prevent separation of the electrodes from the separator. Such separation impairs battery function. Second, the bond must provide for a high degree of contact between the separator and electrode so as to permit efficient ion transfer. Third, the distance between electrodes must be as short as possible to permit efficient ion transfer, while still providing a restriction to electron flow that would cause a short circuit.

The anode of a lithium ion battery may be constructed from a carbonaceous material suspended in a polymer matrix. These carbonaceous materials can reversibly accept and donate significant amounts of lithium. Examples of suitable carbonaceous materials include synthetic and natural graphite, petroleum coke and doped coke. The anode may be constructed from transition metal compounds having layered structures into which lithium ions can be intercalated and deintercalated during charge and discharge. These cells are referred to as rocking chair cells. The rocking chair compounds have electrochemical potentials close to that of lithiated carbon and different from the transition metal oxides frequently used for cathodes. Examples of suitable rocking chair anode compounds are $Li_xWO_2$, $Li_xMoO_2$ and $Li_xTiS_2$.

Transition metal oxides are preferred for lithium ion battery cathodes. Li ions can be inserted into and extracted from these intercalating compounds with little or no structural modification of the compound. Examples of suitable transition metal oxides for cathode construction include $LiCoO_2$, $LiNiO_2$ and $LiMn_2O_4$.

Anode and cathode active materials are often formed into anode and cathode structures by binding the active materials in a polymer film or sheet. U.S. Pat. Nos. 4,980,250, 5,219,680, 5,340,670, 5,380,606, 5,426,006, 5,582,931, 5,584,893, 5,643,695 and 5,656,393, incorporated herein by reference, disclose compositions for Li ion cathodes and anodes and methods of making these electrodes. Once the polymer films containing the electrode active materials have set, the electrodes, separator and collectors are generally laminated by heat and pressure.

The separator must provide sufficient insulation between electrodes to prevent the formation of an electrical circuit which causes a short, while at the same time being permeable to migrating lithium ions. Separators have been constructed of very thin sheets of polymer, which are rendered porous by removal of plasticizers from cast films. The polymer matrix may be composed of olefin, polyvinyl alcohol, polyvinylidene difluoride and associated copolymers and the like. Alternatively, a preformed porous woven or nonwoven polymer mat may be utilized as a separator.

The electrolyte of lithium ion batteries consists of a lithium salt in a nonaqueous solvent. Typical lithium salts include $LiPF_6$, $LiAsF_6$, $LiBF_4$, $LiClO_4$, $LiN(CF_3SO_2)_3$ and $LiN(SO_2C_2F_5)_3$. A nonaqueous environment is maintained in Li ion batteries because lithium and its salts are notoriously reactive in aqueous solutions. Aprotic organic solvents such as propylene carbonate or ethylene carbonate are commonly used. Lithium salts readily disperse in these solvents. Other solvents are tetrahydrofuran, 1,2-dimethoxyethane, dimethyl carbonate, diethyl carbonate, and diethoxyethane. The polymer separator, of course, must be stable to the solvent selected. For a discussion of conventional solvent/lithium solute systems, see S. Hossain, "Rechargeable Lithium Batteries (Ambient Temperature)", in *Handbook of Batteries and Fuel Cells,* D. Linden, Ed., McGraw-Hill, 2nd Ed., 1995, incorporated herein by reference.

The components of lithium ion batteries have been joined by heat and pressure lamination, screen printing, or a combination of the two. U.S. Pat. Nos. 5,584,893, 5,266,299, 5,425,932, 5,540,741, 5,470,357, 5,552,239, 5,219,680, 5,643,695, 5,426,006, 5,656,393 and 5,456,000 disclose methods of forming anode and cathode films from polymer slurries and then laminating these films to a separator and collectors. Such construction methods have certain disadvantages. Joining the components by heat and/or pressure results in a relatively weak bond. A laminated battery may delaminate due to forces generated during charge and discharge, causing battery failure. Second, large scale manufacture of individual polymer films is difficult because sheets of these materials are fragile and subject to fracturing, shearing and other degradation. Third, manufacture of separate anode, cathode and separator polymer films and subsequent joining by lamination consists of many separate manufacturing steps.

U.S. Pat. No. 5,582,931 (Kawakami, et al. 1996) represents an attempt to solve some of these manufacturing problems. The inventors screen print anode and cathode slurries onto a separator and allow the slurries to air dry. Conductors, and where appropriate, a lithium metal negative electrode are then heat and pressure connected to the positive electrode and separator. The cast electrodes are allowed to air dry, which occurs as solvent evaporates from the slurry into the atmosphere. However, the electrodes formed by this process may be compromised. Electrode slurries contract as they dry. When electrode slurries are simply allowed to air dry, the outside surface of the electrode (the side not contacting the separator) dries first, forming a "skin" around the undried inner portion of the electrode which still contains unevaporated solvent. As the inner portion of the electrode continues to dry, stress develops because of constraints imposed on the continued contraction of the inner electrode by the dry outer "skin." This drying/curling stress can cause debonding of the electrode from the separator, leading to poor battery performance.

SUMMARY OF THE INVENTION

In accordance with the present invention, a composite separator and electrode suitable for use in a secondary lithium ion battery contains an electrode domain and a separator domain. The electrode domain and separator domain are joined together in a polymer matrix to form a composite. The electrode domain and separator domain are juxtaposed so as to share a continuous area of contact having a length and a breadth. The resultant composite allows ions to freely migrate from the electrode domain through the separator domain during successive charging and discharging of the battery. The composite may consist of a separator domain and two electrode domains or a separator domain and one electrode domain. An electrode domain contains electrode active material, preferably graphite, doped coke, coke, $LiCoO_2$, $LiNiO_2$, $LiMn_2O_4$ and the like. The electrode domain is capable of reversibly accepting and donating ions during successive charging aid discharging of the electrode domain. The separator domain preferably contains a fibrous, porous polymer mat, preferably nonwoven, impregnated with a coating polymer. Alternatively, the separator domain may also consist simply of plasticized polymer.

The composite separator and electrode may also comprise a polymer matrix, with a fibrous, porous mat and electrode active material embedded in the polymer matrix. The fibrous, porous mat and electrode active material are juxtaposed so as to share a continuous area of contact having a length and a breadth. The electrode active material can be a carbonaceous material or a lithiated metal oxide, preferably graphite, doped coke, coke, $LiCoO_2$, $LiNiO_2$, $LiMn_2O_4$ and the like. The fibrous, porous mat embedded in the polymer is preferably a non-woven polymer mat. The polymer matrix of the composite further consists of a plurality of individual polymer molecules which are interspersed uniformly throughout the polymer matrix so that the composite is seamless and contains no polymer interface.

In use, the electrode and separator composite is a component of a rechargeable lithium ion battery comprising a housing, an electrolyte solution in the housing, the electrolyte solution containing a lithium salt capable of ionizing in an organic solvent, the salt being dispersed in an organic solvent, current collectors electrically connected and disposed in contact with the electrodes, and the electrode and separator composite disposed between the current collectors.

In the preferred process of manufacturing the electrode and separator composite, a fibrous polymer mat is saturated, preferably vacuum saturated, with a polymer solution, the polymer solution is allowed to cure forming a polymer coated separator, an electrode slurry is applied to the polymer coated separator, and the slurry is allowed to cure in a solvent vapor enriched atmosphere or in a vapor retention means. Preferably, the separator may be immobilizes on a solid support capable of drawing a vacuum across its surface by applying a vacuum to one side the separator before applying the slurry. The vapor retention means may consist of a box or other container which partially or fully encloses the slurry-separator structure. The fibrous mat may be nonwoven or woven and consist of polyethylene, polypropylene, or polyvinylalcohol fibers and the like. Suitable polymers for coating the fibrous polymer mat include polyvinylidene difluoride and its associated copolymers, KYNAR® Latex milk and the like. The electrode slurry preferably consists of electrode active material, plasticizer, solvent, polymer, and where appropriate, carbon black. The electrode active material may preferably be selected from graphite, doped coke, coke, $LiCoO_2$, $LiNiO_2$, $LiMn_2O_4$ and the like. After curing, the electrode and separator are joined into a seamless, integral composite which is characterized by a polymer matrix with interspersed polymer molecules. The active material of the electrode slurry dissolves into and intermingles with the separator coating polymer.

DESCRIPTION OF THE PREFERRED EMBODIMENT

In solid state rechargeable lithium ion batteries, the bonding of the separator, anode and cathode is critical not only to the proper functioning of the battery, but also to its manufacturability. Many manufacturing strategies are known in the art for causing the anode, cathode, and separator elements to be juxtaposed, so that ions can flow freely back and forth between the electrodes in successive charging and discharging cycles. For example, the layers can be aligned and then wound into a tight coil, or may be compressed and restrained mechanically. Ideally, however, a stable composite structure of highly elastic construction would permit a much larger range of use and shapes, providing extreme flexibility in the types of housings that contain the battery components.

Electrodes in solid state lithium ion batteries are fabricated from lithium compounds dispersed in thin-layer, porous polymeric sheets. Typically in a solid state lithium ion battery, the cathode is a dispersed lithiated metal oxide with or without a binder. Examples include LiMO where MO is Co, Ni, Mn, or V metal oxides of appropriate valence. Conventional methods of manufacturing cathodes are disclosed in U.S. Pat. Nos. 5,296,318, 4,550,064, 5,260,143, 5,518,842 and 5,380,606, hereby incorporated by reference.

Anodes in solid state lithium ion batteries are typically carbonaceous, comprised of various forms of synthetic or natural graphite, petroleum coke or doped coke. Lithium ions are intercalated into the carbonaceous material to yield $LiC_6$ (graphite) or $LiC_{12}$ (coke). U.S. Pat. No. 5,219,680 discloses a method for making such an electrode by entrapping amorphous carbon in a polymeric premix followed by in situ polymerization around a metallic collector element. U.S. Pat. No. 5,514,490 discloses an unusual anode utilizing a layered titanium phosphate followed by intercalation of Li. A further type of anode material useful with the present separator is a noncrystalline carbon having low density, and a particular Raman spectrum, as disclosed in U.S. Pat. No. 5,401,598. A preferred carbonaceous or other lithium intercalation anode material is compacted graphite dispersed in a porous polymeric matrix. The anode may also include rocking chair compounds, for example $Li_xWO_2$, $Li_xMoO_2$ and $Li_xTiS_2$ and the like. The foregoing patents are hereby incorporated by reference.

For the purpose of this application, electrode active materials include carbonaceous lithium ion intercalating materials, lithiated metal oxides, and rocking chair anode compounds. Lithiated metal oxides include $LiCoO_2$, $LiNiO_2$, $LiMn_2O_4$, and the like. Further cathode and anode materials are described in detail in Hossain, supra.

The plasticizers of the present invention are non-aromatic, aliphatic diesters of the general formula $R_1OOC(CH_2)_nCOOR_2$ wherein $R_1$ and $R_2$ are methyl-, ethyl-, propyl-, butyl-, or combinations thereof, and n is 1 to about 7. The plasticizer must be capable of uniform microdispersion throughout the coating layer, so that upon removal a network of microscopic pores renders the coating ion permeable. Optionally, lithium salts contained in the electrolyte solution may be included in the polymer, plasticizer, and solvent mixtures, so that upon removal of the plasticizer in the polymer coating, a uniform dispersal of lithium salts is obtained in situ.

The separator of the present invention may simply comprise a porous polymer matrix providing sufficient separation between electrodes to prevent the formation of a circuit which causes a short circuit of the battery. This polymer matrix may be composed of olefin, polyvinylidene difluoride and its associated copolymers, polyvinyl alcohol and the like.

Preferably, the separator of the present invention consists of two parts, an inner core matrix of a fibrous homopolymer, embedded in a sheet of porous elastic polymer. The core matrix is a fabric-like composite manufactured in preformed rolls by several vendors such as Web Dynamics and Hollingsworth/Vose. These materials are made of minute polymer fibers, finely comminuted into fibers about 0.1 micron in diameter to about 1.5 microns in length. Structurally the matrix fibers are deposited randomly to create very small pores throughout the fabric body. These matrices may be manufactured by deposition of fibers in the desired thickness onto a running conveyor track, and compressed under rollers into sheets in a process similar to paper manufacture. Alternatively, the fiber sheets may be melt blown. The resultant fiber matrix is preferably 0.75 to 5.0 mils in thickness and has a density of between 15 and 50 grams/sq. meter. Finer materials may be obtained by custom manufacture. Since it is desirable to reduce the ion path between electrodes to every extent, the custom materials will have a target thickness of less than 0.75 mils with a slight increase in density. It is only in the present process, which permits complete saturation of the fiber vacuoles with plastic, that the thickness of the fibrous core and the overall separator can be reduced to 1.75 to 3.00 mils overall without strength failure.

The homopolymers of the separator fibers are selected from polyethylene, polypropylene, polyvinylalcohol, and the like, manufactured by conventional methods. The fibers are made up of semi-randomly disposed strands of high molecular weight polymer. Combinations of homopolymers may theoretically be employed. The homopolymers, being readily commercially available in pre-formed sheets, have a very low unit cost, and are manufactured according to specifications giving good reproducibility in battery applications. The fiber matrix provides strength and resilience, which may account for its resistance to fracture.

The selection of the elastic polymer is largely dependent upon the composition of the core matrix material. In the situations in which polyethylene or polypropylene fiber is used, a polymeric infusion of polyvinylidene difluoride is preferred. For a polyvinylalcohol core, a water compatible interpositional material such as KYNAR® Latex milk (Elf-Atochem) or a TEFLON® dispersion such as Dupont T-30 is preferred. The fundamental requirement is that the elastic polymer sheet formed after vacuum diffusion be porous, or be capable of being rendered porous, to permit ion transport. Typically, the polymer, which is a powder, is dispersed in an organic solvent such as acetone. A plasticizer is added, the viscosity is adjusted by curing at room temperature or slightly elevated temperatures at 40°–60° C., and the mixture is applied to the fibrous core, as follows:

The fibrous core is placed on a vacuum table and vacuum is applied to the core side face down on the table. A laterally moving casting block is filled with the polymeric mixture and applied to the upper surface by spreading at the desired thickness. The vacuum continues to be applied until all of the solvent has been drawn off. The vacuum is released, he fibrous core fabric is inverted so that the vacuum side is now exposed, and the vacuum process is repeated with the casting block. Multiple thin coatings may be applied, and result in a smoother, more uniform coating.

In this process, the polymeric mixture is pulled by the vacuum into the fibrous core matrix, completely filling the interstitial void spaces. The proportion of solvent is large enough (greater than 20 percent by volume), so that when the polymer fronts advancing through the fibrous core meet and overlap the residual solvent reliquifies the surrounding polymer, and when dried of the solvent, forms a continuous, unitary polymeric sheet in which the fibrous core matrix is embedded. There are no true layers of polymer on the fibrous matrix, the interfaces between the advancing polymer boundaries having merged to lose completely any independent identity. The resulting structure is very pliant, translucent, and smooth, but extraordinarily strong, as shown in the Examples.

The overall thickness of the separator is important because it defines the path length from one electrode to the other. As pointed out above, custom manufacture can reduce the thickness of the matrix. The thickness of polymer remaining on the separator surfaces should be a minimum of about 0.5 mils. Joining of the electrodes, particularly in continuous composite construction, requires about 1.0 mil. In any event, it appears that a more uniform coating is achieved when an excess of polymeric mixture is run onto the matrix surface for distribution by the casting block.

The vacuum table is a flat manifold having a large plurality of holes approximately 1.0 to 5.0 mm in diameter. A fine mesh screen (200×200 mesh) is placed over the manifold to prevent the matrix from being pulled into the holes. A typical vacuum assembly for laboratory scale utilizes a Variac in combination with a vacuum pump fitted with a 1–6 hp motor. An adequate amount of polymeric mixture is achieved when the interstitial spaces of the fiber matrix are saturated with polymeric mixture. Saturation has occurred when the void spaces are completely filled.

On an industrial scale, it may be impractical to apply polymeric mixture to a single flat sheet at a time. The present method is adaptable to preparation of an entire roll of fabric stock by passing the stock through a coating bar, and then infusing the polymeric mixture into the matrix by passing over a vacuum drum, first on one side and then coating again and passing the reverse side over a second vacuum drum. For multiple coatings, a corresponding plurality of drums may be employed.

Application of coating may be effected by any conventional method including spreading or casting with a doctor blade, rolling, or controlled spraying. The ratio of ingredients in the coating mixture will affect the porosity and adhesive properties of the coated structure. The ratio of polymer to plasticizer should preferably be on the order of 2:1 to 1:10, and the ratio of polymer/plasticizer to acetone may be between about 1:5 to 2:1 for best results. Ratios are expressed as w/w. Fillers such as $TiO_2$ or $SiO_2$ appear to be unnecessary in the coating to provide material strength.

The secondary battery components that can be used with the composite separator and electrode of the present invention are electrolyte and current collector systems known in the solid state (dry) lithium ion field of battery technology using plastic electrode and separator materials. In the electrolyte solutions, typical lithium salts include $LiPF_6$, $LiASF_6$, $LiBF_4$, $LiClO_4$, $LiN(CF_3SO_2)_3$, and $LiN(SO_2C_2F_5)_3$. Typical solvent systems for dispersion of the lithium salt include diethyl, ethyl, propyl, or dimethyl carbonate, or mixtures thereof, tetrahydrofuran, 1,2-dimethoxyethane, and other organic solvents in which lithium salts can ionize. In general, solvents of low viscosity are preferred (<0.5 cP at 25 degrees C.), to facilitate ion migration and diffusion. Water adsorption characteristics are important, since lithium salts are highly unstable in aqueous environments. Suitable solvents must have a water content of less than 10 ppm.

The current collector elements useful in the present battery are conventional metals. Preferred collectors are typically perforated or expanded metals with a plurality of minute holes.

The present invention is a composite electrode and separator for use in any type of battery, preferably a lithium ion battery. The composite can comprise an anode and separator, a cathode and separator, or preferably an anode, cathode and separator. The electrodes are comprised of electrode active materials dispersed in a plasticized polymer matrix. The separator may be any polymer structure which provides sufficient separation between electrodes to prevent the formation of a circuit which causes a short circuit of the battery; preferably, the separator is a polymer coated and impregnated fibrous mat formed by vacuum coating.

The electrode active materials are mixed into slurries containing solvent, polymer and plasticizer. In a preferred method, the slurry contains a relatively high percentage of solvent (about 45 to 60 percent by weight.) The slurry further contains about 30 to 50 percent by weight of electrode active material. A cathode slurry can preferably contain about 2 to 10 percent by weight carbon black to improve conductivity. The slurry further may contain plasticizer in a ratio of polymer to plasticizer of about 2:1 to 1:10 by weight. The separate anode and cathode slurries may be referred to collectively as electrode slurries or first and second electrode slurries.

These electrode slurries are applied to the separator, preferably the vacuum coated non-woven polymer mat (polymer saturated separator) described above. Application of the slurry may be accomplished, without limitation, by casting, screen printing, spraying or electrodeposition and the like.

The bonding process of the present invention is carried out by curing the electrode slurries in a solvent enriched or charged atmosphere. The solvent enriched or charged atmosphere contains solvent vapor in a concentration higher than is normally found in the atmosphere. The atmosphere is normal air.

In practice, the separator is preferably immobilized on a solid support capable of drawing a vacuum across its surface, such as a vacuum drum surface or flat-bed vacuum surface. The first electrode slurry is then applied to the first side of the separator forming a separator-first electrode slurry structure. The separator-first electrode slurry structure then is enclosed or partially enclosed in a solvent vapor retention means, such as a box, container or other enclosure allowing the transient formation of a solvent vapor enriched or charged atmosphere. The slurry coated side of the separator is exposed to the interior of the vapor retention means and the non-slurry coated side of the separator is exposed to the outside atmosphere. The slurry coated separator is positioned within the vapor retention means so that the slurry is suspended upside down. As the electrode slurry cures, the evaporated solvent accumulates in the vapor retention means creating a solvent vapor enriched or charged atmosphere. As curing continues, the solvent enriched atmosphere of the container eventually equilibrates with the outside atmosphere as the solvent passes through the forming electrode and separator composite and into the outside atmosphere.

After the first electrode slurry cures, normally about 5 to 30 minutes, the separator-first electrode structure is then immobilized on drum vacuum surface or flat-bed vacuum surface and coated on the second separator side with the second electrode slurry. This structure is then enclosed or preferably partially enclosed in a vapor retention means. The second electrode slurry coated side of the separator-first electrode structure is exposed to the interior of the container, the first electrode side is exposed to the outside atmosphere and the second electrode slurry is suspended upside down from the separator-first electrode structure. The bonding process occurs as above.

Figure 7:
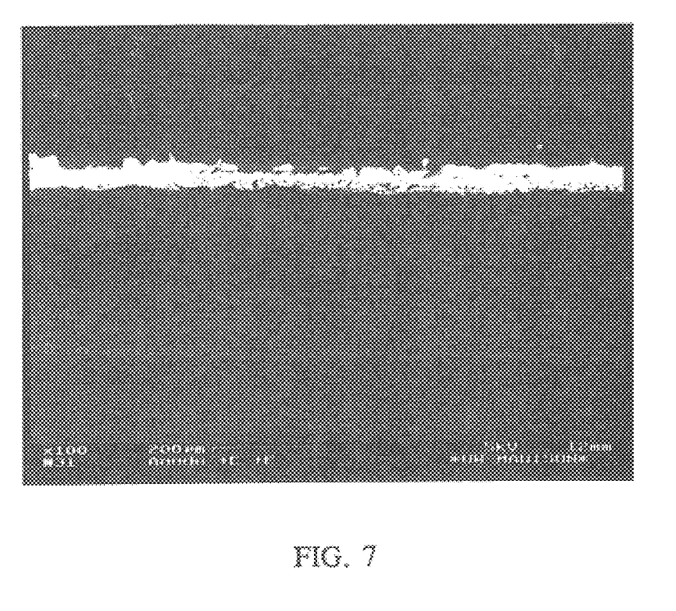
FIG. 7 is a scanning electron micrograph (X100) of a cross-section of a composite electrode and separator.
Figure 8:
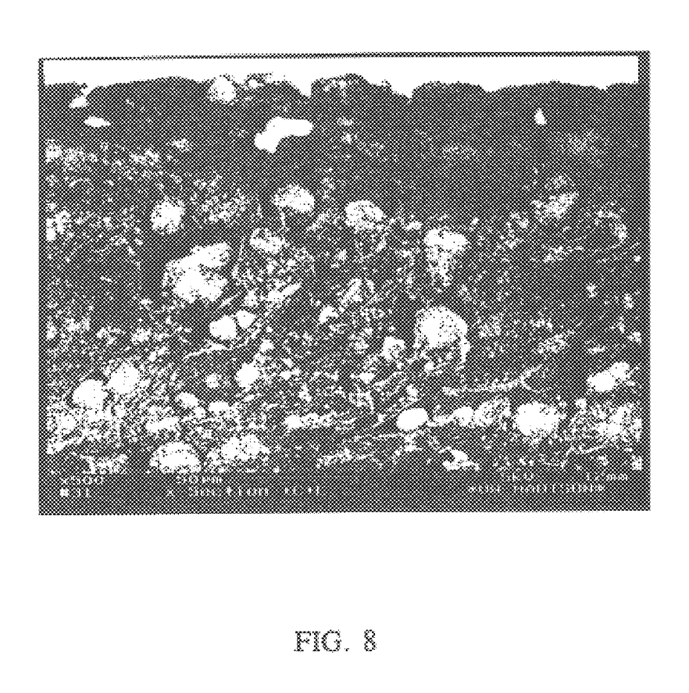
FIG. 8 is a scanning electron micrograph (X500) of a cross-section of a composite electrode and separator.

The bonding process is characterized by an increased total elapsed curing time of the electrode slurries as compared to the elapsed time of curing in normal air. This process of drying in a solvent vapor enriched or charged atmosphere allows for uniform drying, resulting in an electrode with a more dense concentration of active materials than electrodes obtainable by air drying. FIGS. 7 and 8 are scanning electron micrographs of the separator and electrode composite.

The foregoing process allows the joining of an electrode domain and a separator domain by the formation of a boundaryless bond between the electrodes and separator, which may be characterized in various ways.

Figure 1:
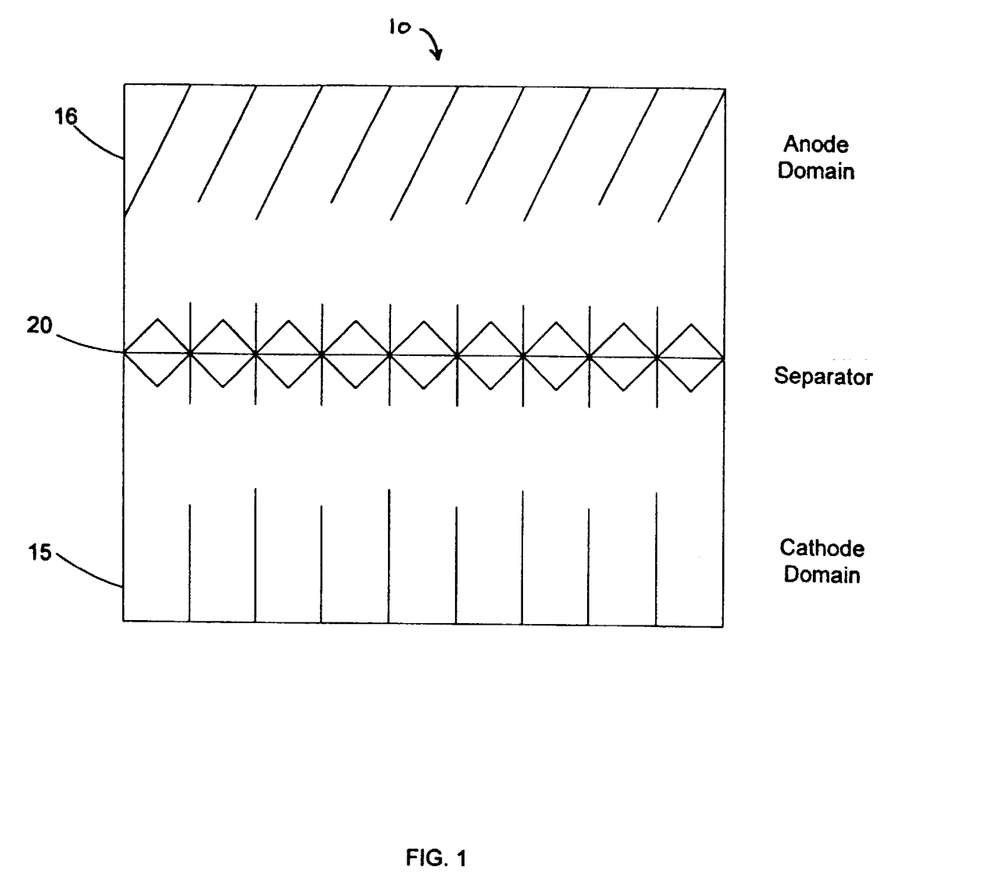
FIG. 1 is a schematic cross-sectional drawing of a typical plastic layered battery showing fusion of cathode and anode domains to the separator.

First, referring to FIG. 1, the composite separator-electrode 10 may be characterized as having three domains, a cathode domain 15, an anode domain 16, and a separator domain 20. The boundaries of the separator domain and electrode domain are merged creating a seamless unitary structure. The cathode domain and anode domain include their respective electrode active materials. The separator domain may include a porous, fibrous mat, preferably coated and impregnated with a coating polymer. The cathode domain 15, anode domain 16, and separator domain 20 are joined together seamlessly and exist within the electrode and separator composite 10. Because of intermingling of layers, no interface exists between the anode, cathode and separator domains. However, the domains retain discreet functionalities. The electrode domains are capable of reversibly accepting and donating ions during successive charging and discharging of the battery; the separator domain remains permeable to ion migration during charging and discharging and provides a suitable separation of the electrode domains to prevent short circuiting. The composite electrode-separator may be further characterized as integral or seamless. Seamless means that no interface exists between the electrode containing polymer and separator coating polymer; the layers are intermingled. In contrast, conventional batteries have true interfaces between different layers, as in laminated sheets of electrode and separator films.

Second, a composite, unitary electrode and separator structure is formed that is characterized by a matrix of polymer in which the electrode active material and polymer mat are embedded. When the electrode slurry is applied to the polymer coating portion of the separator, the solvent present in the electrode slurry partially dissolves the polymer coating, resulting in the rearrangement of the polymer matrix at the surface of the separator by dissolution, so that the polymers of the electrodes become interspersed with the polymer molecules of the polymer coating of the separator. The polymer matrix where the electrode and separator domains join is therefore indistinguishable from the polymer matrix at any other point in the composite.

The electrode and separator domains are juxtaposed within the composite electrode-separator. This means that the electrode domain and separator domain are arranged next to each other. The separator domain and electrode domain may be characterized as having length and breadth. The electrode domain and separator domain are disposed so that they have contact along their length and breadth. Just as the domains are juxtaposed, the components of the domains are juxtaposed. The electrode active materials are disposed so as to have contact with the length and breadth of the separator.

These foregoing descriptions assume that the electrode polymers are the same polymer as the separator saturating polymer. The electrode polymers and separator polymers may be different, as long as they are dissolvable in the same solvent. In a case where the polymers are different, the bond is characterized by rearrangement of the polymer matrix of the surface of the separator so that the polymer of the electrode is uniformly interspersed with the separator polymer. A seamless bond is formed because the polymers are interspersed at the original slurry-separator interface.

In contrast to other bonding techniques, the bonding process of the present invention results in the formation of a flexible electrode of uniform density, as demonstrated by electron micrography, having intimate intermingled contact with the separator along the electrode's entire breadth and length. Curing in a solvent enriched atmosphere avoids problems associated with curing in normal air. These problems include the tendency of the electrode to crack and debond at the electrode-separator interface. When curing occurs by air drying, the solvent evaporates quickly from the slurry surface. This results in the formation of a dense, dried "skin" on the surface of the electrode as well as contraction of the electrode at its surface. The interior electrode (area under the skin layer) then dries at a slower rate, resulting in a stress gradient. This stress gradient due to drying shrinkage causes the electrode to curl, and the associated curling stresses cause the electrode to crack near the electrode's interface with the separator. These cranks result in a loss of contact between the electrode and separator, thus compromising the efficiency of the battery. This is supported by the observation that electrodes air dried on a separator have debonded during cycling. Additionally, manual peel tests show a lower bond strength when air dried.

The slurry may be applied to the separator in a variety of configurations. For example, a sheet of separator may be coated with an electrode slurry along its entire length and width. The resulting composite electrode-separator can then be cut to the desired size. Alternatively, the electrode slurry may be applied to a separator sheet in a series of discreet areas separated by areas with no slurry coating. Such a configuration would allow the folding of the resulting battery or allow smaller batteries to be cut from the supporting separator sheet without the shorting concerns associated with cutting through active materials.

The present secondary battery structure may be manufactured with components having a wide variety of shapes and sizes. Since the composite remains highly flexible, the battery components car be embedded within the very structure of the object to be powered. Because of the capability for a large number of recharging cycles, the lifetime of the battery may often be longer than that of the powered article itself.

Further advantages of the present invention will be apparent from the Example which follows.

EXAMPLE 1

A separator according to the method of the invention was made as follows: a base non-woven polyethylene fiber sheet (Web Dynamics, PX0074) was purchased from the vendor. The manufacturer's specifications of the material include a thickness dimension of 2.5 mils and a pore size not to exceed 0.1 mm. The product is manufactured having a rough (non-calendered) surface on one side and a smooth (calendered) surface on the other side. The density of the material was empirically determined as 28 g/m$^2$.

The polymer coating step was carried out on approximately 25 inch long by 6 inch wide sections of the fiber sheets. A coating mixture was prepared containing 19 g KYNAR® 2801 (range 5–30%) brand polyvinylidene difluoride copolymer, 33 g (range 10–35%) dibutyl adipate (as a plasticizer), and 135 ml (balance) of reagent grade acetone. The copolymer and the acetone were measured into a sealed container, shaken for approximately five minutes, then allowed to stand for one hour to dissolve the copolymer. The plasticizer was then added, the container resealed and shaken for approximately one minute, then allowed to stand for fifteen minutes to equilibrate.

Figure 6:
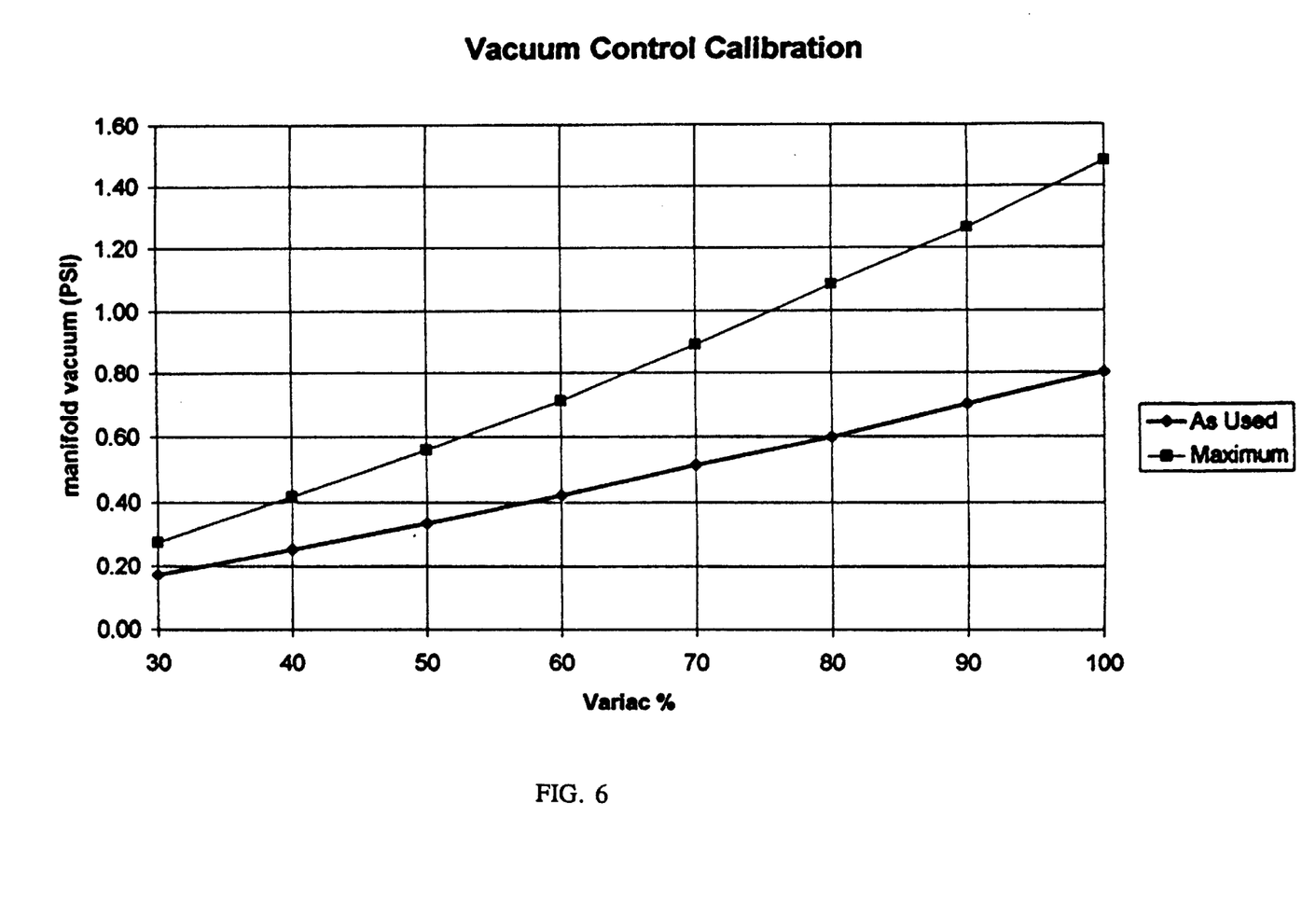
FIG. 6 is a graph showing the relation of Variac setting to corresponding vacuum units. The Variac controls voltage to the vacuum unit.

A sheet of backing paper approximately, 0.004" thick was placed on top of a fine mesh screen, having a 200×200 mesh configuration which was positioned on top of the vacuum plate having 51×23⅛th inch holes bored through to a common vacuum manifold. The section of fiber sheet was then placed on a vacuum table with the rough side facing down onto the backing paper. An excess of coating mixture (approximately 10 ml) was spread onto the vacuumized fiber sheet and distributed smoothly over the surface with a casting block having a six mil gap. After vacuum drying the sheet was reversed, and coating mixture was applied through an eight mil gap to the rough side. After drying the sheet was again reversed, and coating mixture was applied through a three mil gap to the original, first or smooth side over the previous coating layer. Finally after drying the sheet was again reversed, and coating mixture was applied through a three mil gap to the second or rough side over the previous coating layer. Coated weight was approximately 105 g/m$^2$, with a base thickness of 2.5 mil and a coated thickness of about 4.5 mil. Table 4 shows the relation of Variac setting to the vacuum values generated in either pounds per square inch or millimeters of mercury. These values are plotted in FIG. 6.

The separator so produced was incorporated into a solid state lithium ion battery as follows: the cathode comprised 65 percent LiNiO$_2$ (FMC) dispersed in a matrix of substantially similar composition to the copolymeric coating of the separator. The plastic electrode also contained 5.5 percent carbon black (Super-P brand) to improve conductivity. A slurry of the cathode material was applied to one side of the separator and was dried while suspended upside down in a solvent vapor charged chamber until the acetone (solvent) was dissipated. See Table 3 for standard formulations.

The anode comprised 65 percent graphite (MCMB 2528 manufactured by Osaka Gas) in a slurry similar to the cathode, and was applied to the reverse side of the separator and dried in a similar manner. This unitary structure was then placed into an ether bath to remove the plasticizer followed by a vacuum drying process to remove residual ether.

Following drying, current collectors and appropriate foil leads were attached to the anode (copper) and cathode (aluminum). The finished unitary, bonded battery structure was then placed into a flexible aluminized plastic housing which was then sealed across the foil leads and both sides. This package was then placed into a moisture- and oxygen-free chamber where a predetermined quantity of electrolyte (1.2 ml to 1.4 ml) was dispensed into the package. The electrolyte composition was ethylene carbonate, dimethyl carbonate and 1 molar $LiPF_6$. The complete electrolyte may be purchased commercially. Following electrolyte dispensing, the open end of the package was sealed to prevent oxygen or moisture ingress and electrolyte loss. Following removal from the moisture-free and oxygen-free chamber, the battery was allowed to stand for 16 hours at ambient temperature and pressure for the electrolyte to absorb into the electrodes and separator.

The following tests were performed on this battery using an Arbin cycler. The battery was charged in a conditioning cycle at constant 11 milliampere current for up to 12 hours or until a voltage endpoint of 4.15 volts was attained. The 4.15 volt potential was held constant for an additional two hours. After a ten minute rest, the battery was discharged at 14 milliamperes down to 2.5 volts.

In the second, and subsequent cycles, current was applied at 14 milliamperes for up to 10 hours or until a voltage endpoint of 4.15 volts was attained. The 4.15 volt potential was again held constant for an additional two hours. After a ten minute rest, the battery was discharged at 14 milliamperes down to 2.5 volts.

Figure 2A:
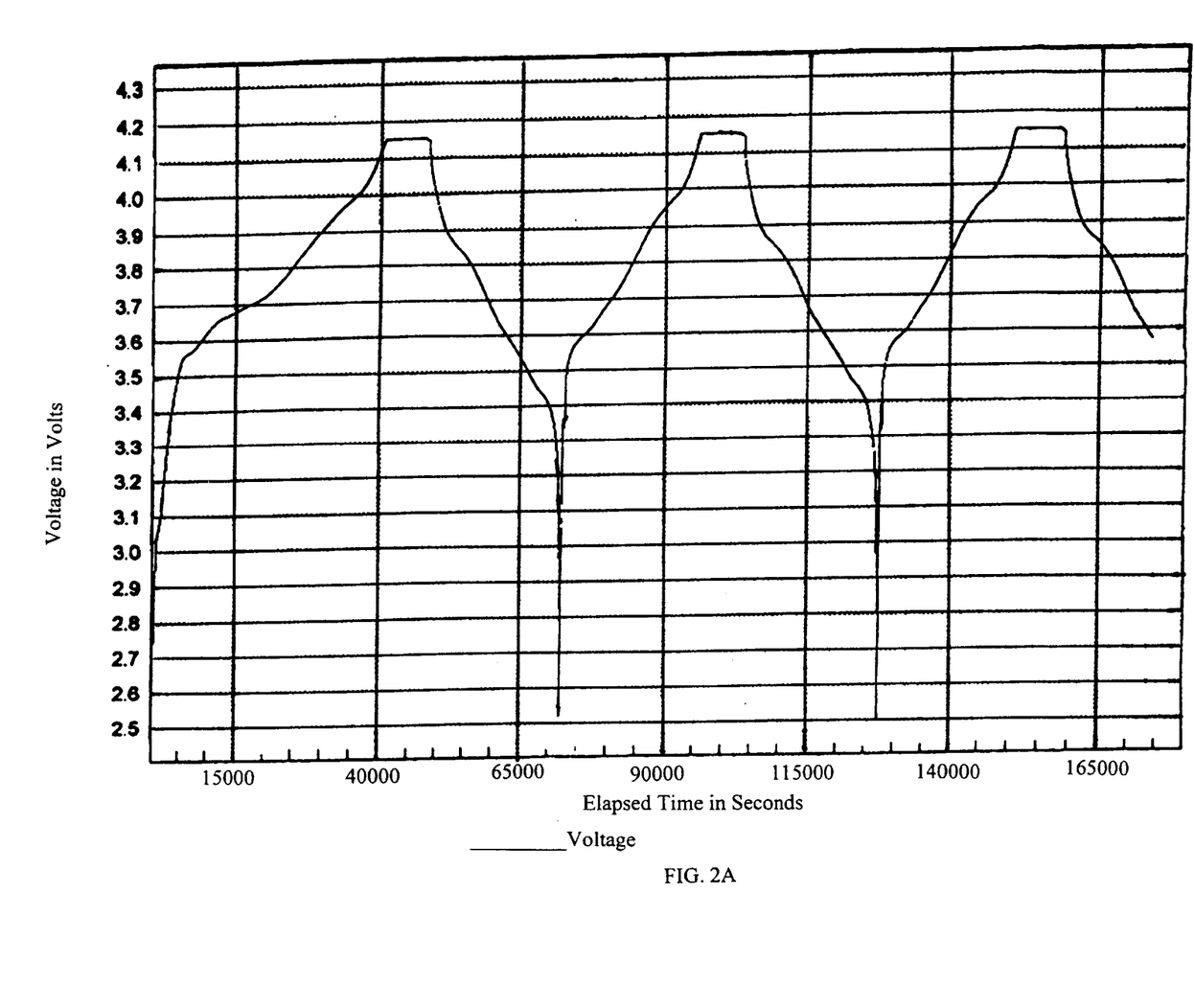
FIGS. 2a and 2b are rectilinear plots showing the charge and discharge voltage profiles of a typical secondary lithium ion battery of this invention (a) and the corresponding capacity curves (b).
Figure 2B:
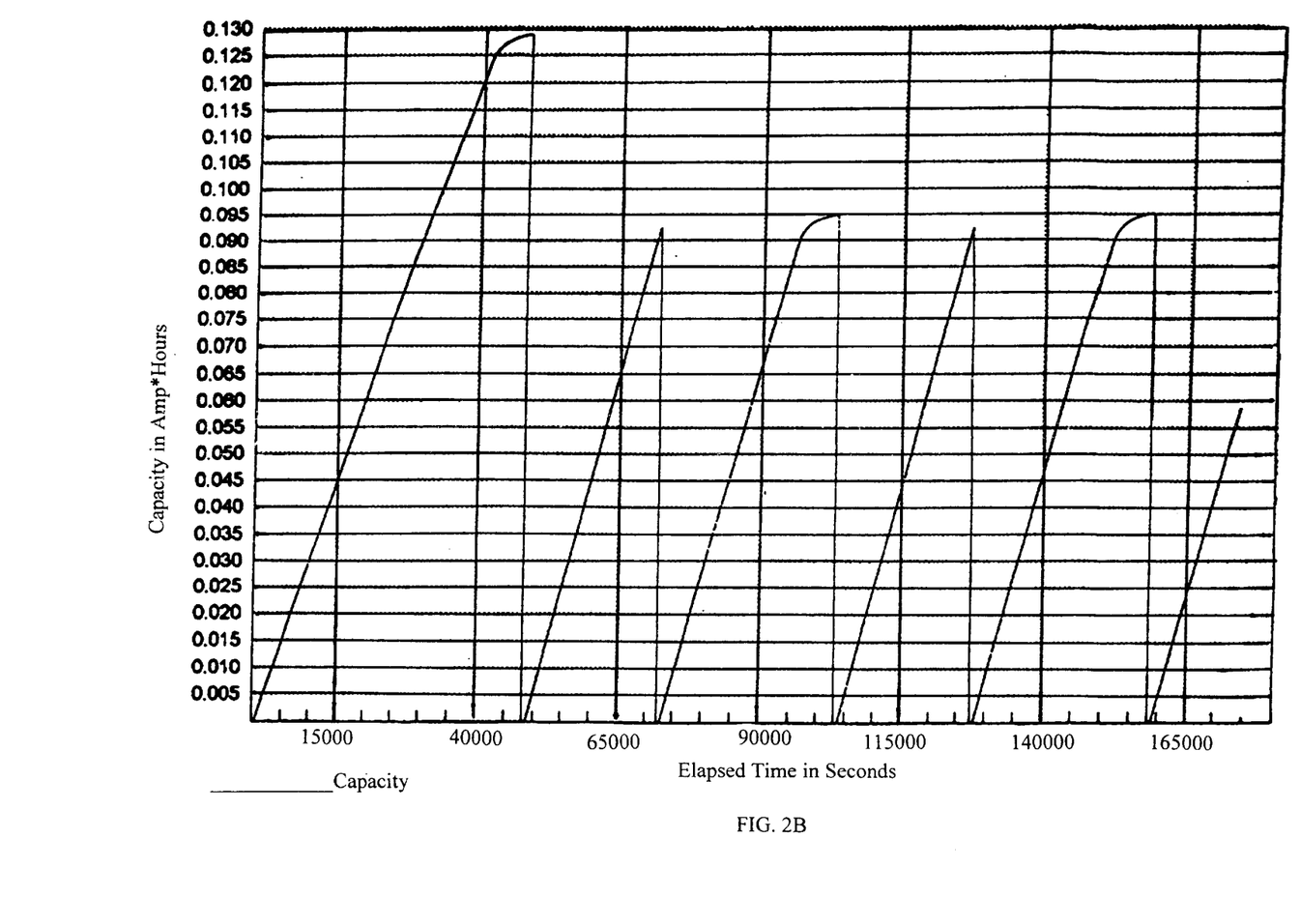
Figure 3A:
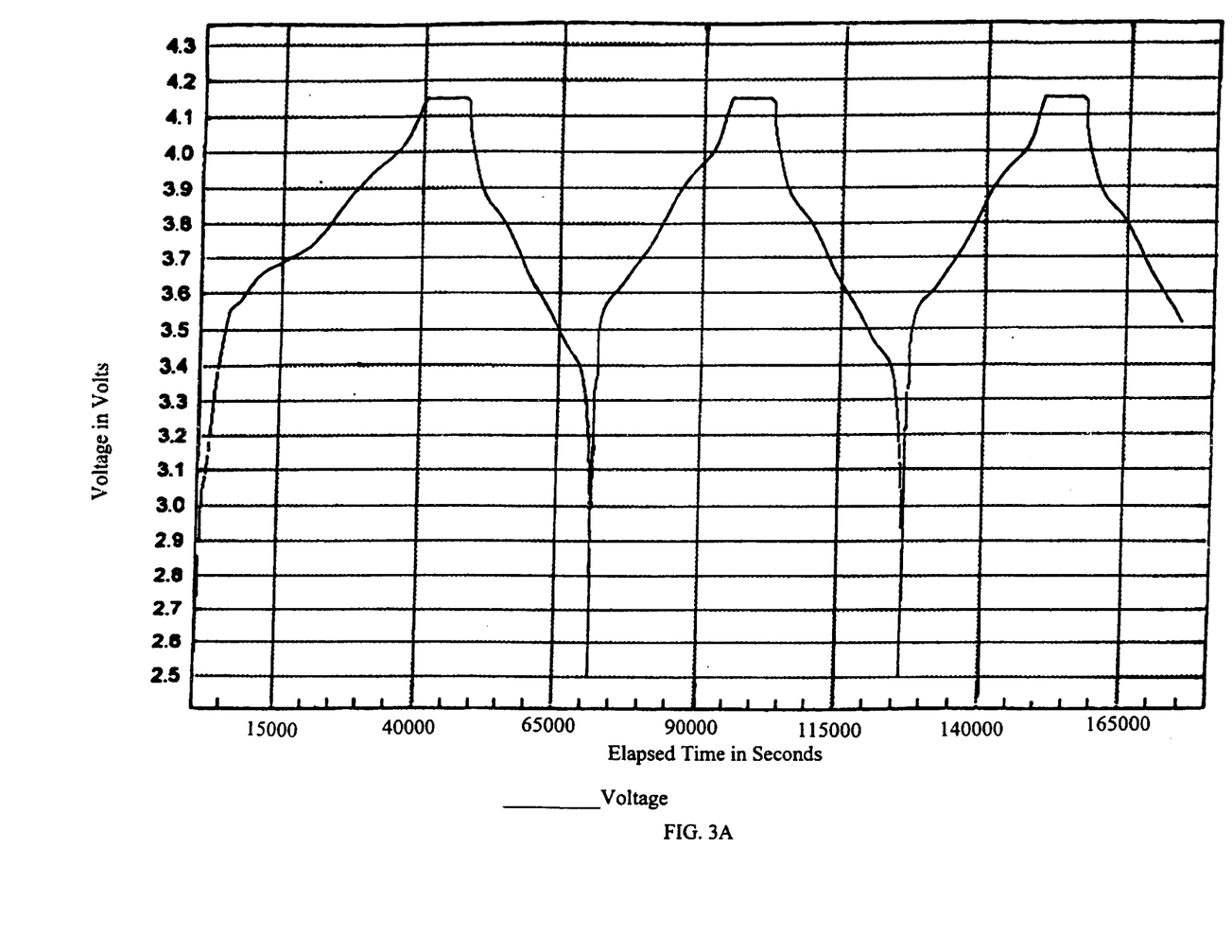
FIGS. 3a and 3b are rectilinear plots showing the charge and discharge voltage profiles for a second lithium ion battery of this invention (a) and the corresponding capacity curves (b).
Figure 3B:
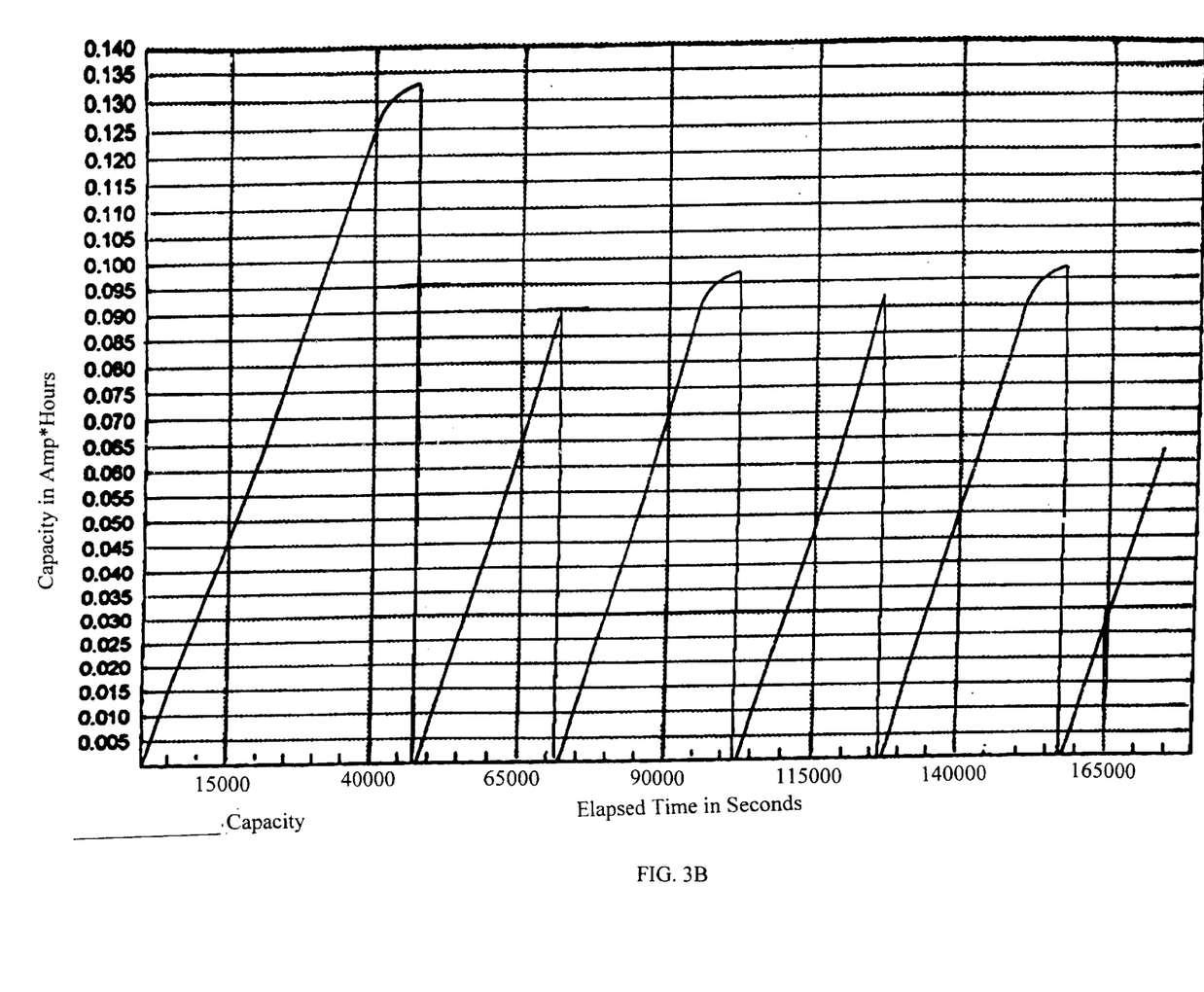
Figure 4A:
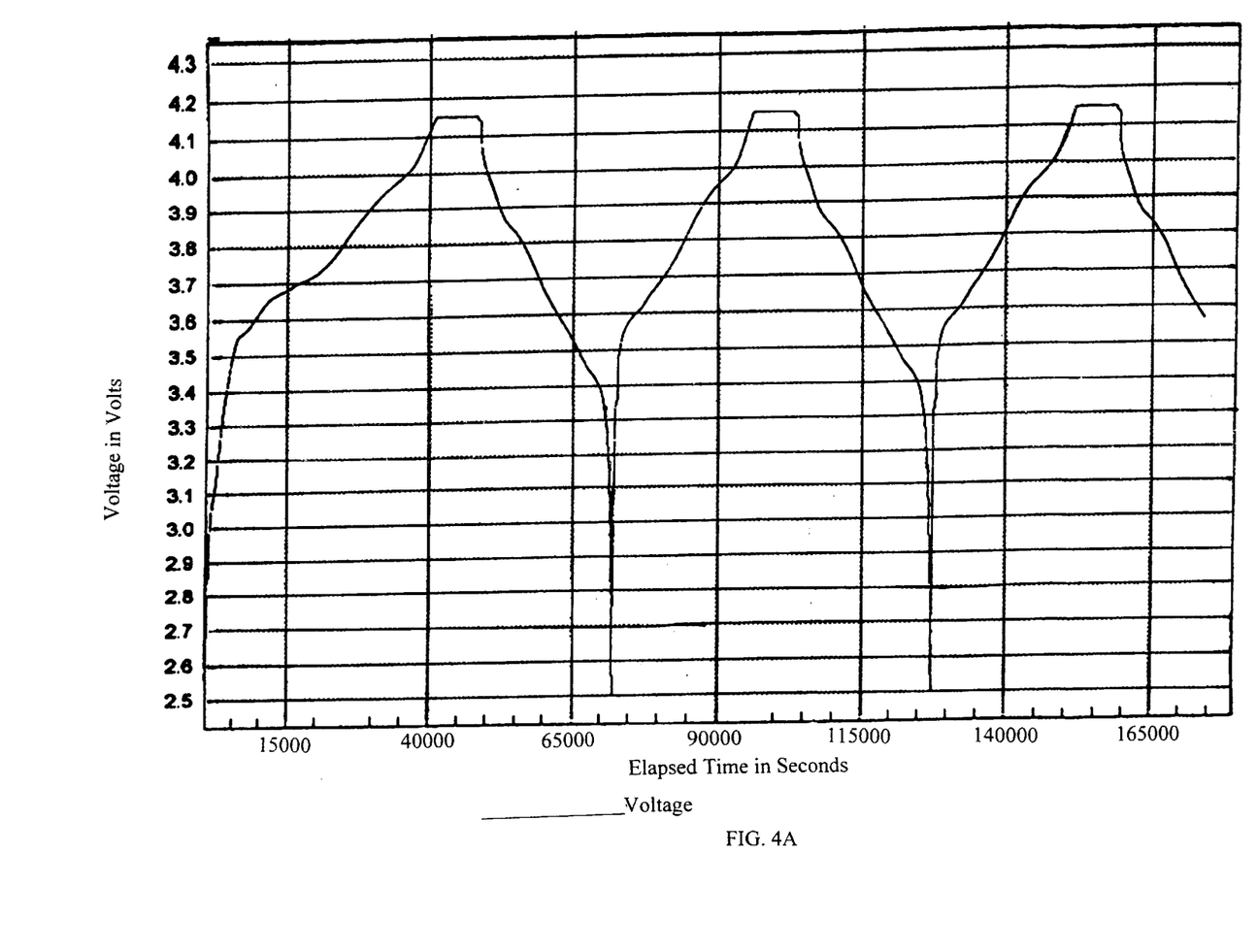
FIGS. 4a and 4b are rectilinear plots showing the charge and discharge voltage profiles of a third lithium ion battery of this invention (a) and the corresponding capacity curves (b).
Figure 4B:
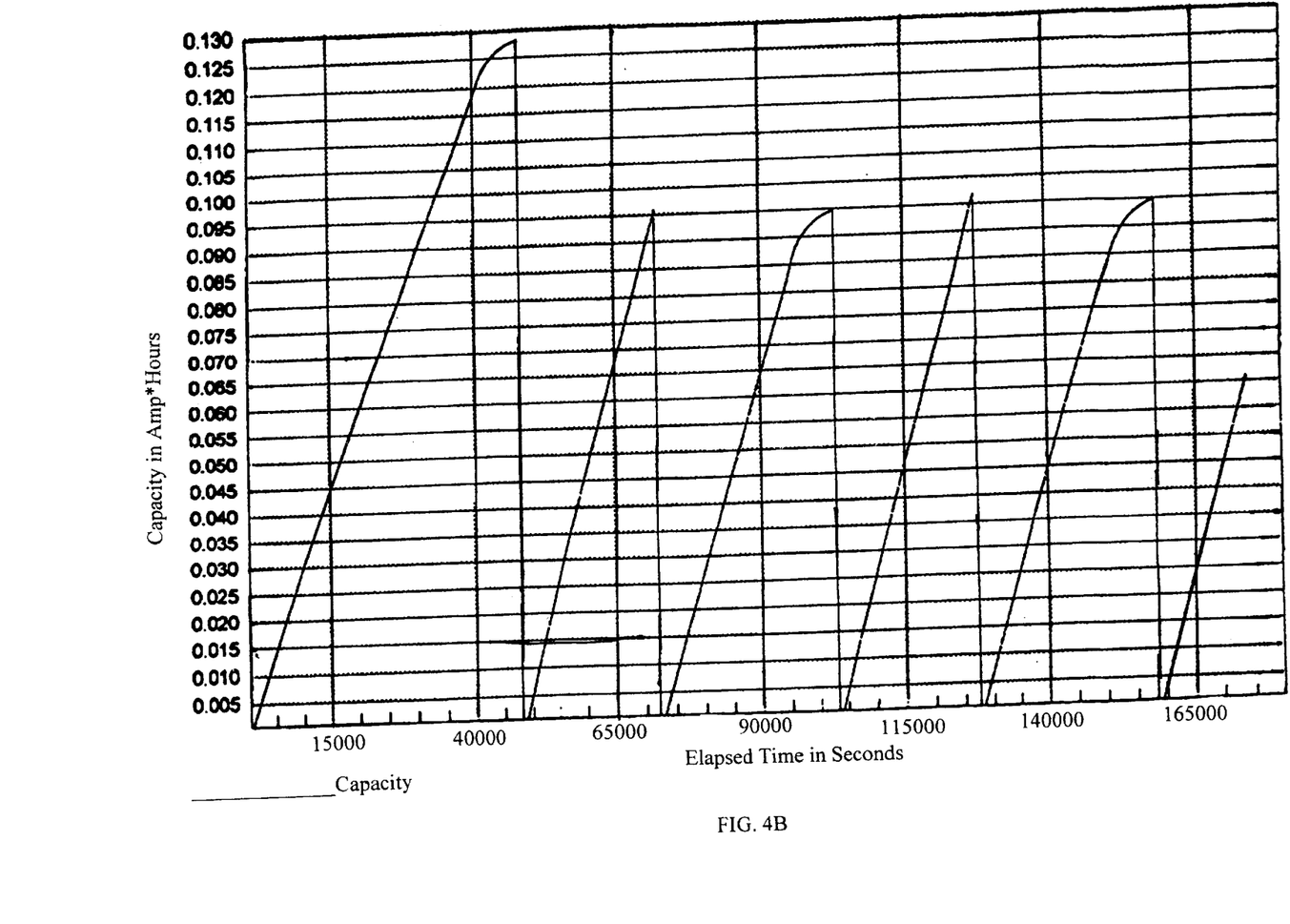
Figure 5:
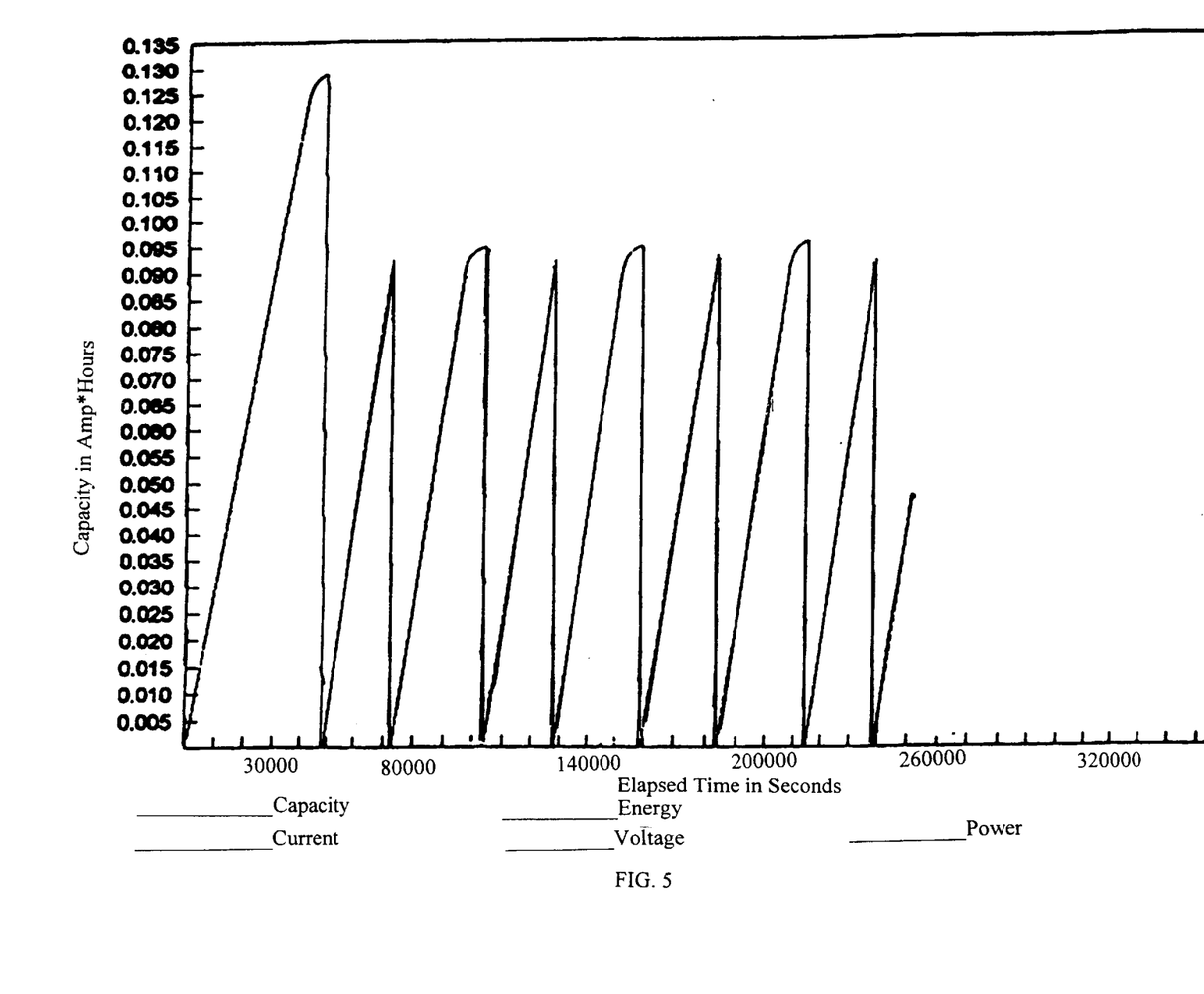
FIG. 5 is a capacity curve for the first of the secondary batteries (FIGS. 2a and 2b) showing capacity curves for further cycles.

The plots (FIGS. 2a, 3a, and 4a) show minimal voltage drop during the transition from charge to rest, indicating low internal resistance, which is attributable in large part to the excellent porosity of the separator. The flat slope of the charge curves indicates that the C/10 rate factor is in agreement with the expected capacity value. In the capacity curves (FIGS. 2b, 3b, and 4b) each of the batteries shows that when subjected to repeated cycles of charge/discharge, there is an initial 95 mA-hours in and 92 mA-hours out, with a subsequent charge/discharge efficiency reproducibly and repeatedly attaining 97 percent (compare sharp discharge spike height to rounded charge spike height). FIG. 5 shows that there is no deterioration of capacity upon further charge/discharge cycles.

EXAMPLE 2

Routine handling of the present separators, and subjecting them to unusual laboratory stress indicated an unusually low failure rate which suggested that the matrix materials embedded in a solid, continuous plastic sheet imparted a strength not observed in separators of laminar construction. To test this hypothesis, separator sheets of the present invention were subjected to standard tests for tensile and tear strength. These tests are widely used in the paper industry to determine paper quality.

In the tear test, a stack of rectangles of material are held in the path of a pendulum. The pendulum strikes the sheets at a slit cut in the material, and tears through the sheets. The energy loss of the pendulum is the measure of tear resistance in the sample. This test will show how resistant the sample is to a tear force applied at a single point. This becomes an important manufacturing concern when the separator sheets are positioned for application of the electrode slurries. The tear tests were carried out using TAPPI Test Procedure T414 on an Elmendorf Tear Tester using a 1600 gram pendulum. The results of the tear and tensile are given in Table 1 and Table 2 respectively.

Table 1 gives the tear test results for base fabric (Sample 1), separator made by casting plastic without vacuum penetration (Sample 2), separator made according to the present vacuum process (Sample 3). The results indicate that the tear strength in grams of force is dramatically increased for sample 3. These results also indicate that there is a moderate increase in both machine direction (MD) tear and cross direction (CD) tear for a nonvacuum manufactured cast separator (2× compared to control) and a large increase in vacuum manufactured separators (4× compared to control), thus illustrating the significant increase in tear strength of the unitary sheet.

Table 2 shows the results for a tensile stretch test. In this test, material is pulled by its ends and the distance it stretches before breakage is measured. This test has predictive value for evaluating how well a material will tolerate tension as experienced during handling. The results indicate that the vacuum applied separators are superior to those passively cast on the fabric matrix. This means that rolls of separator can be stretched taut to ensure the proper registration of material during electrode coating. Also, since breakage is associated not with tension as an absolute value, but with a stretch difference, stretch tolerances can be used to QC the process controls, rather than guessing at pounds of tension associated with each step of the process. Tensile tests were conducted using TAPPI Test Procedure T494.

TABLE 1

| Sample ID | | Tear Scale Reading 32-ply MD | Tear Scale Reading 32-ply CD | Tear gf MD | Tear gf CD | Tear Index mN sq m/g MD | Tear Index CD |
|---|---|---|---|---|---|---|---|
| Sample 1 | Mean | 12.7 | 15.1 | 6.4 | 7.6 | 2.3 | 2.7 |
| | S.D. | 1.3 | 0.3 | | | | |
| | Max | 14.0 | 15.0 | | | | |
| | Min | 11.0 | 15.0 | | | | |
| Sample 2 | Mean | 24.0 | 31.7 | 12.0 | 15.9 | 2.4 | 3.2 |
| | S.D. | 0.7 | 3.3 | | | | |
| | Max | 25.0 | 37.0 | | | | |
| | Min | 23.0 | 27.0 | | | | |
| Sample 3 | Mean | 48.1 | 52.8 | 24.1 | 26.4 | 3.2 | 3.5 |
| | S.D. | 2.7 | 2.6 | | | | |
| | Max | 51.0 | 55.0 | | | | |
| | Min | 44.0 | 48.0 | | | | |

TABLE 2

| Sample ID | | Tensile lb/in | Stretch % | TEA J/Sq m | Tensile Index N-M/g |
|---|---|---|---|---|---|
| Sample 1 | Mean | 1.27 | 6.21 | 10.02 | 8.15 |
| | Min | 1.15 | 3.62 | 4.75 | 7.41 |
| | Max | 1.33 | 8.07 | 13.61 | 8.54 |
| | S.D. | 0.05 | 1.34 | 2.69 | 0.30 |
| Sample 2 | Mean | 1.66 | 67.39 | 145.67 | 5.97 |
| | Min | 1.15 | 46.76 | 92.24 | 5.36 |
| | Max | 1.33 | 81.98 | 13.61 | 6.56 |
| | S.D. | 0.05 | 10.67 | 30.18 | 0.36 |

TABLE 2-continued

| Sample ID | | Tensile lb/in | Stretch % | TEA J/Sq m | Tensile Index N-M/g |
|---|---|---|---|---|---|
| Sample 3 | Mean | 1.53 | 85.85 | 161.90 | 3.61 |
| | Min | 1.47 | 78.76 | 143.66 | 3.47 |
| | Max | 1.60 | 92.33 | 186.62 | 3.79 |
| | S.D. | 0.05 | 4.81 | 14.27 | 0.13 |

TABLE 3

STD CATHODE

| Material | Weight % | Wt-Acet | Wt % |
|---|---|---|---|
| LiNiO$_2$ | 31.80 | 146.50 | 66.38 |
| Carbon Black | 2.65 | 12.20 | 5.53 |
| KYNAR ® | 4.86 | 22.40 | 10.15 |
| DBA | 8.60 | 39.60 | 17.94 |
| Acetone | 52.09 | 0.00 | 0.00 |
| | 100.00 | 220.70 | 100.00 |

STD ANODE

| Material | Weight % | Wt-Acet | Wt % |
|---|---|---|---|
| MCMB | 35.85 | 179.65 | 66.77 |
| Carbon Black | 1.99 | 9.97 | 3.70 |
| KYNAR ® | 5.48 | 27.44 | 10.19 |
| DBA | 10.40 | 52.10 | 19.36 |
| Acetone | 46.29 | 0.00 | 0.00 |
| | 100.00 | 269.16 | 100.00 |

STD SEPARATOR

| Material | Weight % | Wt-Acet | Wt % |
|---|---|---|---|
| KYNAR ® | 11.88 | 22.40 | 36.13 |
| DBA | 20.63 | 39.60 | 63.87 |
| Acetone | 67.50 | 0.00 | 0.00 |
| | 100.00 | 62.00 | 100.00 |

TABLE 4

TABLE COVERED WITH PLASTIC SIMULATOR FILM

| Variac | PSI | mm Hg |
|---|---|---|
| 100 | 1.48 | 77 |
| 90 | 1.26 | 65 |
| 80 | 1.08 | 56 |
| 70 | 0.89 | 46 |
| 60 | 0.71 | 37 |
| 50 | 0.56 | 29 |
| 40 | 0.42 | 22 |
| 30 | 0.28 | 14 |

TABLE COVERED WITH UNCOATED WEB DYNAMICS PX0074

| Variac | PSI | mm Hg |
|---|---|---|
| 100 | 0.80 | 41 |
| 90 | 0.70 | 36 |
| 80 | 0.60 | 31 |
| 70 | 0.51 | 27 |
| 60 | 0.42 | 22 |
| 50 | 0.33 | 17 |
| 40 | 0.25 | 13 |
| 30 | 0.17 | 9 |

EXAMPLE 3

A cross-section of the composite electrode and separator of the present invention was analyzed by scanning electron micrography (X100). The composite electrode and separator was made as described in the specification and Examples 1 and 2.

The cross-sectioned samples were carefully cut with a new Xacto Knife and were then mounted on pin-type sample stubs using double-sided conductive tape. Electrical grounding was further enhanced with a small amount of conductive carbon paint which was used to make a connection from the stub surface to the sample. Care was taken during mounting to ensure that the cross-sectional area of interest protruded over the edge of the sample stub in order to provide a clear view. For observation, the samples were then mounted on a stage, which is pre-tilted to 90 degrees providing a direct view of the cross sections without further tilting the SEM. Samples were viewed without further treatment (i.e. no conductive coatings, etc.)

The samples were viewed in a LEO 982 Field Emission SEM which is capable of accelerating voltages from 0.5 kV to 30 kV, working distances from 1 mm to 30 mm, and magnifications from 20× to 800,000×. The instrument has detectors for Secondary Electron Imaging (SEI), Back-scattered Electron Imaging (BSE), Back-scattered Electron Kikuchi Pattern (BSEKP), and Energy Dispersive Spectroscopy (EDS). For this study, only the ET SEI detector was used since this gives the most topographic detail. All samples were imaged at an accelerating voltage of 5 kV. Working distance ranged between 8 mm and 12 mm. Image magnification was 100×.

The resulting micrograph is shown in FIG. 7. The electron dense white structure in the middle is the porous, non-woven mat having polymer filled voids. The regions above and below the non-woven mat are electrode domains formed by bonding the polymer slurry containing electrode active material to the polymer coated separator. No discernable interface exists between the electrode domain containing the electrode active material and the polymer coating of the non-woven mat (the separator domain).

EXAMPLE 4

FIG. 8 is a cross-section view of the composite separator and electrode of example 3 at a higher magnification (X500). Preparation and imaging was conducted as in Example 3. The electron dense white layer at the top of the micrograph is the non-woven mat having polymer filled voids. The electron dense globular particles dispersed throughout the polymer matrix below the non-woven mat are the electrode active particles of the electrode domain. The darker, less electron dense, area between the non-woven mat and the majority of the electrode active particles is the polymer surface coating of the non-woven mat and represents the separator domain. This view demonstrates two things. First, the bonding process results in the migration of electrode active particles into the polymer coating of the non-woven mat, representing a complete integration of the separator and electrode domains. Second, no interface exists between the polymer coating of the non-woven mat and the polymer containing the electrode active material. Therefore, no interface exists between the electrode domain and separator domain.

What is claimed is:

1. A composite separator and electrode comprising:
an electrode domain, said electrode domain capable of reversibly accepting and donating ions during successive charging and discharging of said electrode domain;
a separator domain having a porous support structure, said separator domain being permeable to ion migration during charging and discharging of said electrode domain; and
a polymer matrix, said electrode domain and said separator domain joined by said polymer matrix to form a unitary composite having said support structure embedded within said polymer matrix; said separator domain and said electrode domain juxtaposed in said composite without a line of demarcation between the separator and the electrode domain.

2. The composite of claim 1 wherein said electrode domain further comprises electrode active material selected from the group consisting of lithium intercalation materials and lithiated metal oxides.

3. The composite of claim 2 wherein said lithium intercalation materials are selected from the group consisting of synthetic graphite, natural graphite, petroleum coke and doped coke.

4. The composite of claim 2 wherein said lithiated metal oxides are selected from the group consisting of $LiCoO_2$, $LiNiO_2$ and $LiMn_2O_4$.

5. The composite of claim 1 wherein said porous support structure comprises a fibrous, porous support selected from the group consisting of woven and non-woven polymer mats.

6. A composite separator and electrode comprising:

a unitary, homogenous polymer matrix;

an electrode active material embedded in said polymer matrix; and a fibrous, porous polymer mat embedded in said polymer matrix, said fibrous, porous mat juxtaposed with said electrode active material, whereby the polymer matrix provides an interface between the electrode and the separator without a line of demarcation between the electrode and the separator.

7. The composite of claim 6 wherein said electrode active material is selected from the group consisting of carbonaceous material and lithiated metal oxides.

8. The composite of claim 7 wherein said carbonaceous material is selected from the group consisting of natural graphite, synthetic graphite, petroleum coke and doped coke.

9. The composite of claim 7 wherein the said lithiated metal oxides are selected from the group consisting of $LiCoO_2$, $LiNiO_2$ and $LiMn_2O_4$.

10. The composite of claim 6 where said porous, fibrous mat is selected from the group consisting of non-woven and woven polymer mats.

* * * * *